(12) United States Patent
Matsufusa et al.

(10) Patent No.: US 6,603,459 B2
(45) Date of Patent: Aug. 5, 2003

(54) TWO-DIRECTION INPUT DEVICE AND OPERATING DEVICE USING COMBINATION OF TWO-DIRECTION INPUT DEVICE AND COORDINATE INPUT MEMBER

(75) Inventors: Hideto Matsufusa, Fukushima-ken (JP); Akihisa Itoh, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 132 days.

(21) Appl. No.: 09/814,421

(22) Filed: Mar. 21, 2001

(65) Prior Publication Data

US 2001/0043190 A1 Nov. 22, 2001

(30) Foreign Application Priority Data

May 12, 2000 (JP) ........................................ 2000-139721

(51) Int. Cl.[7] ................................................ G09G 5/00
(52) U.S. Cl. ........................ 345/156; 345/161; 345/163; 345/167; 345/168; 345/173; 345/810; 200/5 R; 200/5 EB; 200/11 J; 200/176; 200/178; 200/260; 273/148 B; 463/36; 463/37; 463/38
(58) Field of Search ................................ 345/156–161, 345/163, 173, 174, 786, 810, 830, 831; 200/5 R, 5 A, 5 B, 5 C, 5 D, 5 E, 5 EA, 5 EB, 176, 177, 178, 11 J, 16 R, 16 C; 463/36–38; 273/148 B

(56) References Cited

U.S. PATENT DOCUMENTS

| | | | | | |
|---|---|---|---|---|---|
| 5,378,863 | A | * | 1/1995 | Sekita | 200/16 D |
| 5,969,309 | A | * | 10/1999 | Nishimura et al. | 200/16 C |
| 6,150,919 | A | | 11/2000 | Shimomura | |
| 6,246,019 | B1 | * | 6/2001 | Nakamura et al. | 200/5 R |
| 6,348,913 | B1 | * | 2/2002 | Cho | 345/163 |
| 6,369,798 | B1 | * | 4/2002 | Yatsu et al. | 345/158 |
| 6,429,846 | B2 | * | 8/2002 | Rosenberg et al. | 345/156 |

* cited by examiner

*Primary Examiner*—Harry N. Tran
(74) *Attorney, Agent, or Firm*—Brinks Hofer Gilson & Lione

(57) ABSTRACT

An operating device which enables various input operations. A two-direction input device is provided in front of a flat input member. When an operation button is moved in a Y1 or Y2 direction, a switch device is turned ON. In a case where one of the switch devices is ON, the operation button can be pressed, and at this time, a press switch device is turned ON. In use of this two-direction input device, a series of operations such as selection and determination of menu displayed on a display screen can be quickly performed.

7 Claims, 4 Drawing Sheets

TWO-DIRECTION INPUT DEVICE AND OPERATING DEVICE USING COMBINATION OF TWO-DIRECTION INPUT DEVICE AND COORDINATE INPUT MEMBER

BACKGROUND OF THE INVENTION

1. Field of the Invention

The present invention relates to a two-direction input device which enables input operations in two directions, and an operating device using the two-direction input device installed in a personal computer and the like.

2. Description of the Related Art

As an operating unit of personal computer or the like, a flat input member is often used. Generally, a two-press type operating device is provided in addition to the flat input member. Menu selection and menu determination operations and the like can be made in a menu displayed on a screen by pressing the two-press type operating device.

A conventional operating device as above has a pair of press buttons exposed in an operating portion and a switch device switch-operated by pressing the press buttons.

However, if the operating device provided with the above flat input member is a simple press type device, cursor movement or a so-called scroll operation on a display screen cannot be made only by this operating device. Further, in case of menu selection and determination operations, menu selection is made by operating the flat input member with a finger or the like, and the operation must be followed by menu determination by pressing the press-type input device. In this case, the series of operations cannot be smoothly and quickly performed.

Further, conventionally, an input device (switch) which allows two-direction input by linear movement and press operations is known. The conventional input device of this type allows input operation by linearly moving an operating member, however, the press operation can be made only when the operating member returns to a neutral position but the press operation cannot be made in a state where the operating member has been linearly moved in any direction. Accordingly, even if the input device is installed in the personal computer, the series of operations in which the operating member is slid for menu selection and pressed in the slid position to determine the menu cannot be made.

SUMMARY OF THE INVENTION

The present invention has been proposed to solve the above conventional problems, and has its object to provide a two-direction input device which allows, e.g., menu selection operation and menu determination operation as a series of operations in a personal computer, by enabling press operation in a position where input by linear movement is made.

Further, another object of the present invention is to provide an operating device for a personal computer and the like, using the above two-direction input device.

According to the present invention, the foregoing objects are attained by providing a two-direction input device comprising: an operating member movable in a linear movement direction within a predetermined range and movable in an orthogonal direction to the linear movement direction in any position in the linear movement; detection means for detecting the linear movement of the operating member; and a press switch device that operates when the operating member moves in the orthogonal direction.

In the two-direction input device of the present invention, when the operating member is linearly moved to perform a predetermined input, the operating member can be pressed in the moved position, to operate the press switch device.

Accordingly, in a case where the two-direction input device is installed in, e.g., an operating portion of personal computer, the operating member can be slid to perform cursor movement and scroll operation, and further, in a menu image, the operating member can be slid to perform menu selection and the operating member can be pressed to perform menu determination in the slid position. Note that the two-direction input device of the present invention is not limited to application to the operating portion of the personal computer, but may be installed in, e.g., an operating portion of TV receiving machine, and reception channel selection can be made by sliding the operating member and channel determination can be made by pressing the operating member in the slid position.

For example, the detection means has a pair of switch devices that respectively operate when the operating member moves in one direction and when the operating member moves in another direction. Otherwise, the detection means may be a variable input means such as a variable resistor which continuously changes its output when the operating member linearly moves.

Further, the two-direction input device further comprises: a substrate where the press switch device is provided; a case fixed to the substrate; and an elevation member which is movable up and down in a vertical direction to the substrate within the case and which operates the press switch device when moves down, wherein the operating member is linearly-movably supported on the elevation member within the case.

In this case, it is preferable that the two-direction input device further comprises: first biasing means for biasing the operating member to a neutral position in the linear movement direction; and second biasing means for biasing the elevation member in a direction away from the press switch device.

Further, the present invention provides an operating device comprising a combination of a flat input member enabling coordinate input and the two-direction input device described above.

In this case, when a direction toward an operator is a forward direction, the two-direction input device is positioned in front of the flat input member, and the operating member of the two-direction input device linearly moves in forward and backward directions, whereby vertical scroll input on the display screen can be made by the linear movement of the operating member.

Further, it may be arranged such that another input member is provided on at least one of right and left sides of the two-direction input device.

Further, a combination of two of the two-direction input devices may be used such that the operating member of one of the two-direction input devices and the operating member of the other one of the two-direction input devices move in directions orthogonal to each other. In this case, the combination of the two-direction input devices may be provided with the flat input member or may be provided without the flat input member.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
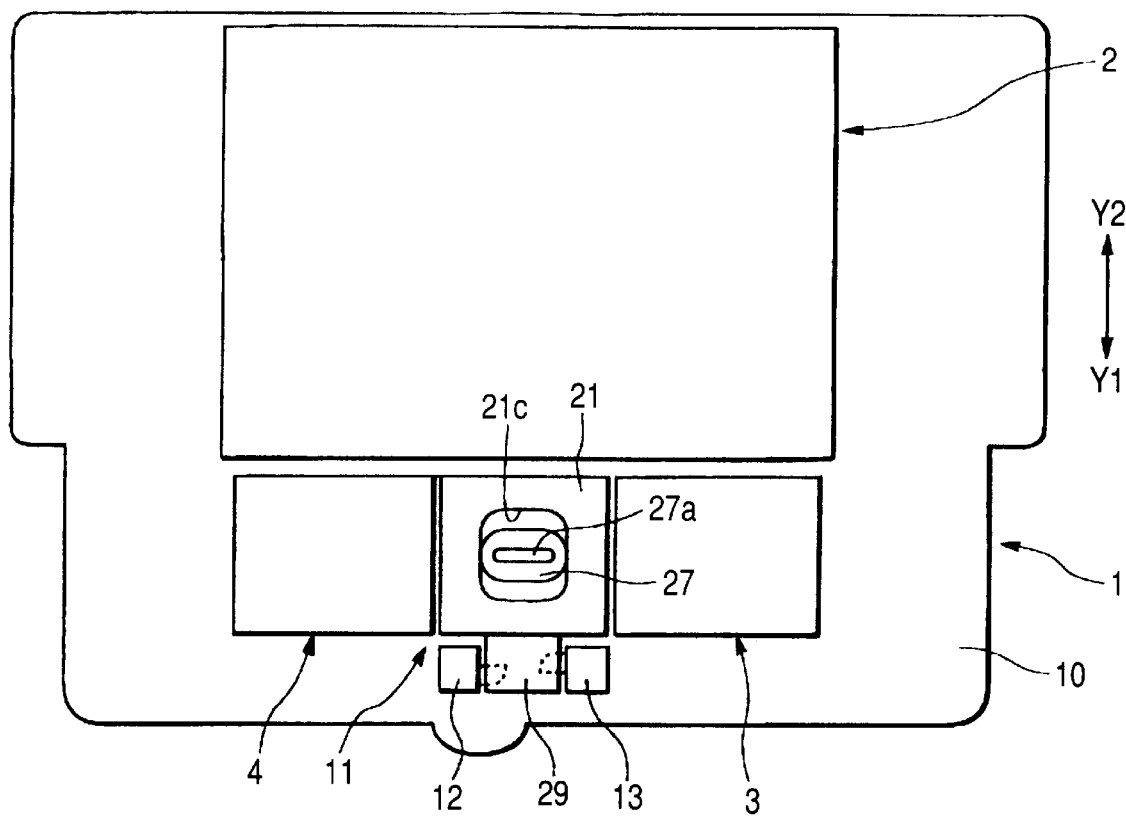
FIG. 1 is a plan view of an operating device according to the present invention.
Figure 2:
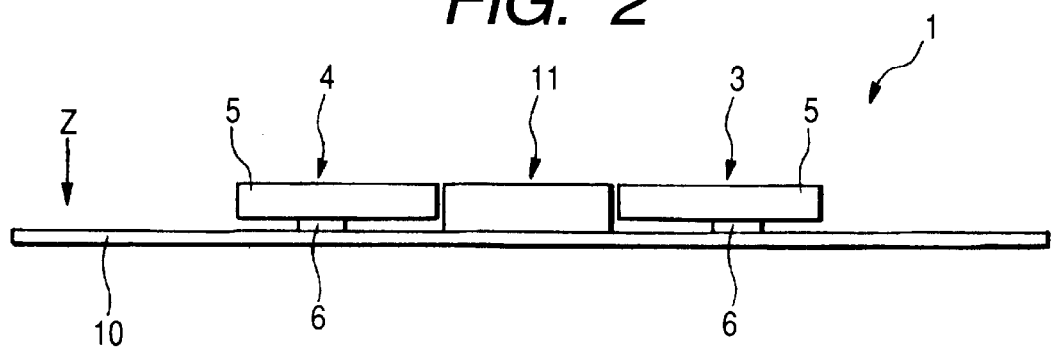
FIG. 2 is a front view of the operating device in FIG. 1.

An operating device 1 in FIGS. 1 and 2 is positioned in an operating portion of a notebook personal computer or the like, in a position front of a keyboard.

The operating device 1 has a flat input member 2. The flat input member 2 is a capacitive or pressure-sensitive member or a member constituted with deposited capacitive and pressure-sensitive members. The capacitive flat input member has an X electrode and a Y electrode in matrix opposite to each other, with an insulating member therebetween. When an inductive member such as a finger comes into contact with the surface sheet of the input member, the capacitance between the X electrode and the Y electrode in the position of contact changes, and as a result, an input on X-Y coordinates can be performed. The pressure-sensitive type flat input member 2 has a resistor provided with a potential difference in X and Y directions and a conductive member opposite to the resistor. When a part of the input member is pressed, the conductive member and the resistor come into contact with each other, as a result, a coordinate input can be performed by change in the resistance value.

In FIG. 1, assuming that a Y1 direction is a forward direction, and a Y2 direction, a backward direction, an operator is opposite to the Y1 (front) side, and the keyboard is provided on the Y2 (rear) side. Further, a display screen is positioned in the rear of the keyboard.

A two-direction input device 11 of the present invention is provided in a central position in front of the flat input member 2. Further, on right and left sides of the two-direction input device 11, press-type input devices 3 and 4 are provided.

The flat input member 2, the press-type input devices 3 and 4, and the two-direction input device 11 are provided on a substrate 10. The substrate 10 is a print wiring board or a metal plate.

As shown in FIG. 2, the press-type input devices 3 and 4 have press-type switch devices 6 and press buttons 5 to press-operate the press-type switch devices 6.

Figure 3:
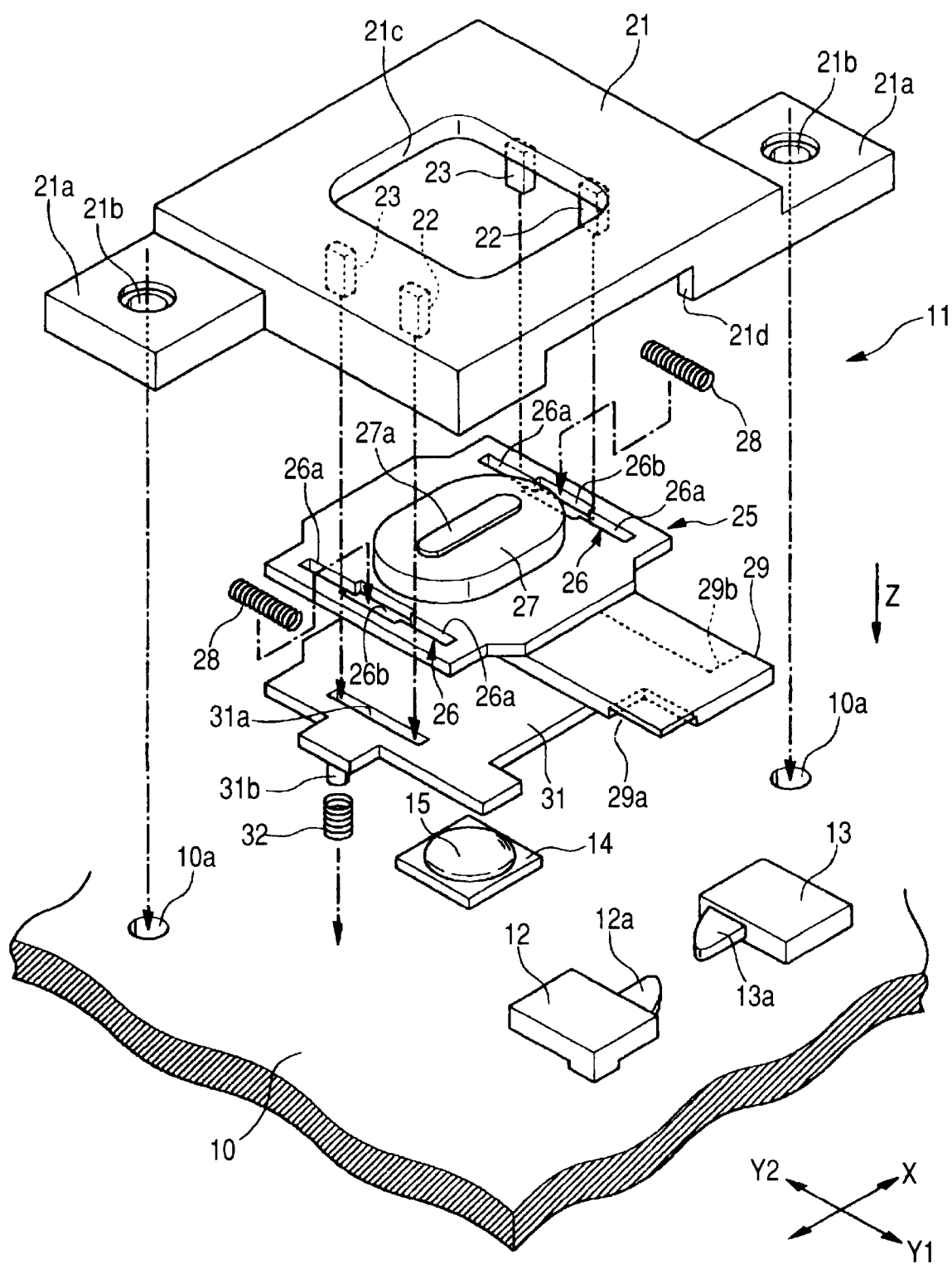
FIG. 3 is an exploded perspective view of a two-direction input device according to the present invention.

As shown in FIG. 3, the two-direction input device 11 has a pair of switch devices 12 and 13 as linear-movement detection means on the substrate 10. A pressure-sensitive projection 12a of the switch device 12 and a pressure-sensitive projection 13a of the switch device 13 are opposite to each other in a horizontal direction (X direction). In the switch device 12, when the pressure-sensitive projection 12a is pressed in the Y1 direction, a switch output is turned ON. In the switch device 13, when the pressure-sensitive projection 13a is pressed in the Y2 direction, a switch output is turned ON.

On the substrate 10, a press switch device 14 is provided in the rear of the switch devices 12 and 13. The press switch device 14 has a dome-shaped (diaphragm-shaped) reverse board 15. When the reverse board 15 is pressed in a Z direction and is deformed, it comes into contact with a contact in the press switch device 14, and a switch output is turned ON.

A case 21 is fixed in a region including the press switch device 14. The case 21, formed with resin material as insulator, has a frame shape covering the press switch device 14. The case 21 have projected fixing pieces 21a integrated with the right and left sides. The fixing pieces 21a have attachment holes 21b. The substrate 10 has female screws 10a. As attachment screws 8 are inserted through the attachment holes 21b and engaged with the female screws 10a, the case 21 is fixed to the substrate 10 (See FIG. 5).

The case 21 has an opening 21c having a predetermined opening width in the forward/backward direction (Y1-Y2 direction) in its upper surface. Further, inside the case 21, first support projections 22 extending in the Z direction are formed integrally with the right and left sides of the opening 21c on the front side (Y1 side), and second support projections 23 extending in the Z direction are formed integrally with the right and left sides of the opening 21c on the rear side (Y2 side). On both sides of the opening 21c, the first support projections 22 and the second support projections 23 are opposite to each other at a predetermined interval in the forward/backward direction.

Figure 4:
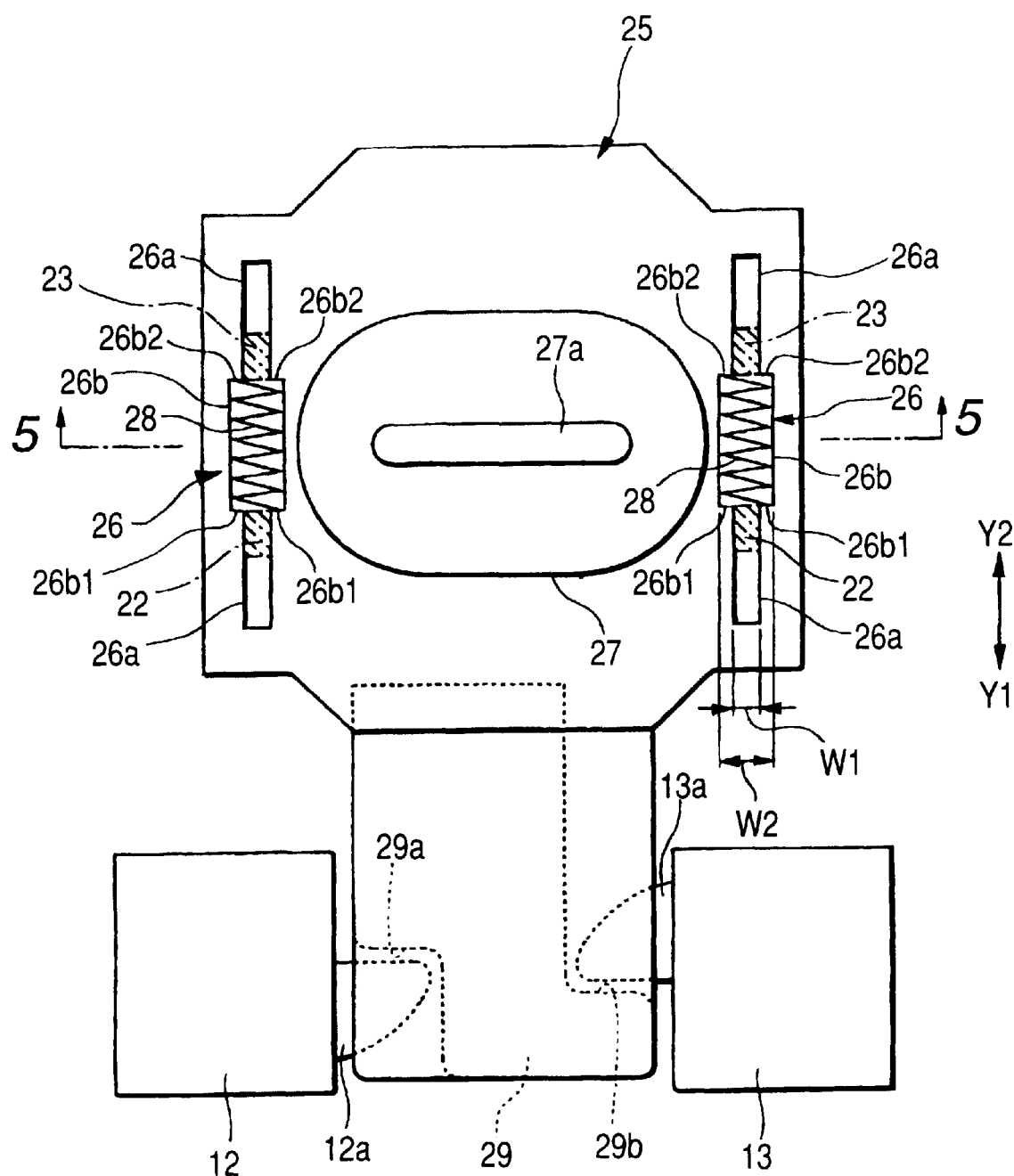
FIG. 4 is a partial plan view showing operations of principal elements of the two-direction input device.
Figure 5:
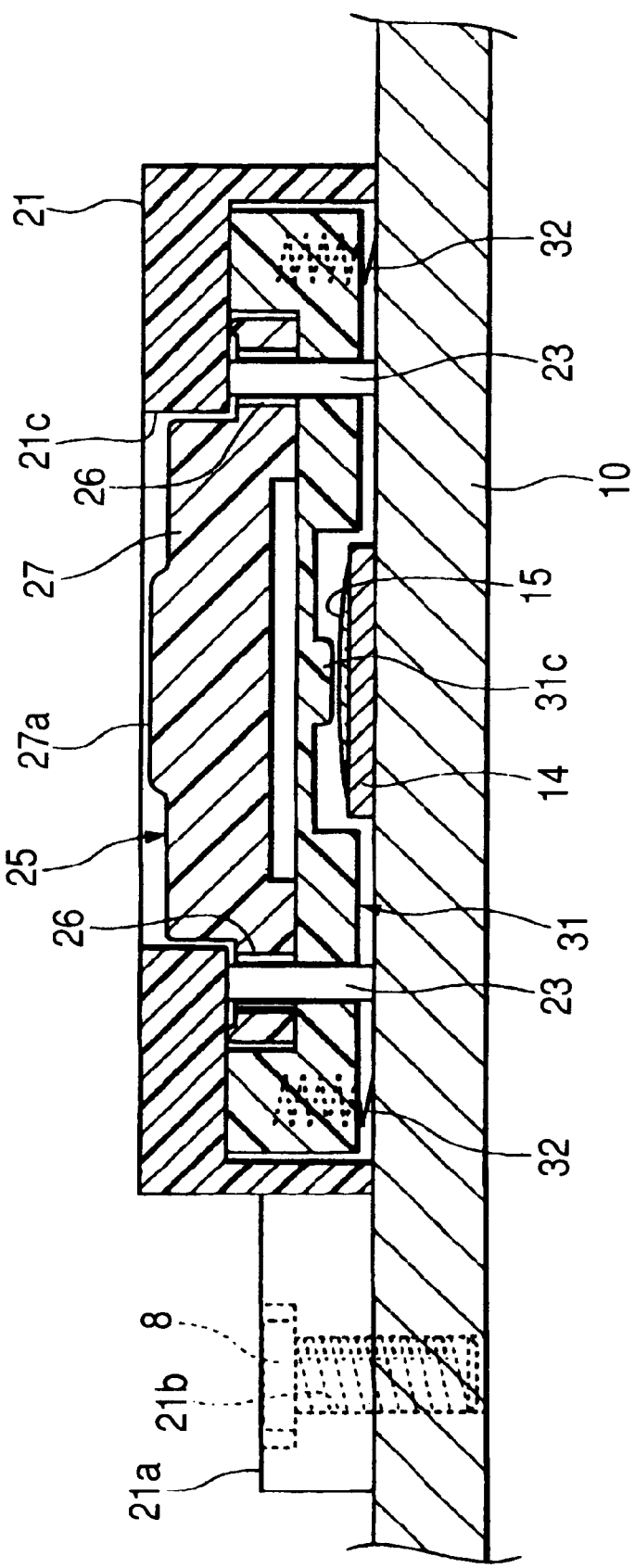
FIG. 5 is a cross-sectional view of the two-direction input device, cut along a line 5—5 in FIG. 4.

An operating member 25 is provided inside the case 21. Guide slits 26 extending in the forward/backward direction (Y1-Y2 direction) are formed in right and left side portions of the operating member 25. As shown in FIGS. 4 and 5, the first support projections 22 and the second support projections 23 are inserted through the respective guide slits 26. The length of the guide slits 26 is longer than the interval between the first support projections 22 and the second support projections 23, in the Y direction.

The operating member 25 is linearly movable in the Y1-Y2 direction within a range where the first support projections 22 and the second support projections 23 slide in the guide slits 26. Further, as shown in FIG. 5, as the first support projections 22 and the second support projections 23 have a length longer in the Z direction than the thickness of the operating member 25, the operating member 25 can freely move up/down in a directions approaching and away from the substrate 10 by sliding movement of the first support projections 22 and the second support projections 23 in the guide slits 26 in the Z direction.

An operation button (operation projection) 27 is formed integrally with an upper surface of the operating member 25. A slip prevention rib 27a is projected from an upper surface of the operation button 27. The operation button 27 can be operated from the opening 21c of the case 21 in a state where the operating member 25 is placed in the case 21.

When the operation button 27 is pressed in the Y1-Y2 direction, the operating member 25 is linearly movable in the Y1-Y2 direction. The operating member 25 moves in the Y direction by sliding the first support projections 22 and the second support projections 23, and movable in the Z direction by sliding the first support projections 22 and the second support projections 23. Accordingly, in a state where the operation button 27 is pressed in the Y direction and the operating member 25 is slid to the Y1 or Y2 side, the operation button 27 can be pressed in the Z direction. Further, even when the operating member 25 is in a neutral position in the Y1-Y2 direction, the operating member 25 can be press-operated.

As shown in FIG. 4, the guide slits 26 formed in the operating member 25 respectively have slide portions 26a with a width W1 in both side portions and a spring holding portion 26b with a larger width W2 in a central portion. Compression coil springs 28 as first biasing means have a coil outer diameter larger than the width W1 such that the coil spring can be attached within the width W2. The compression coil spring 28 is held between the first support projection 22 and the second support projection 23 in the spring holding portion 26b.

Accordingly, when the operating member 25 is moved from the neutral position in FIG. 4 in the Y2 direction, the compression coil springs 28 are compressed between step portions 26b1 of the guide slits 26 and the second support projections 23, and returning forces to the neutral position (returning forces in the Y1 direction) act on the operating member. Further, when the operating member 25 is moved in the Y1 direction, the compression coil springs 28 are compressed between step portions 26b2 and the first support projections 22, and also, returning forces to the neutral position (returning forces in the Y2 direction) act on the operating member.

The operating member 25 has an integrally-formed detection piece 29 projected in the Y1 direction. In a state where the operating member 25 is stored in the case 21, the detection piece 29, passing through a notch portion 21d formed on a front side wall of the case 21, is projected forward (in the Y1 direction).

A first detection dent portion 29a and a second detection dent portion 29b, opposite to each other, are formed in the forward/backward direction in a lower surface of the detection piece 29. As shown in FIG. 4, when the operating member 25 is in the neutral position, any of the pair of switch devices 12 and 13 does not operate. When the operating member 25 moves in the Y1 direction, the pressure-sensitive projection 12a of the switch device 12 is pressed by the first detection dent portion 29a in the Y1 direction, thereby the switch device 12 is turned ON. On the other hand, when the operating member 25 moves in the Y2 direction, the pressure-sensitive projection 13a of the switch device 13 is pressed by the second detection dent portion 29b in the Y2 direction, thereby the switch device 13 is turned ON.

In the case 21, an elevation member 31 is provided under the operating member 25. The elevation member 31 has slits 31a extending in the forward/backward direction in right and left side portions. The first support projections 22 and the second support projections 23 are inserted into the slits 31a. The length of the slits 31a in the forward/backward direction approximately corresponds with the positions of the first support projections 22 and the second support projections 23 in the forward/backward direction. Accordingly, the elevation member 31, guided by the first support projections 22 and the second support projections 23, is movable upward/downward. Note that the elevation member 31 almost cannot move in the forward/backward direction (Y direction).

Spring holding pins 31b extending toward the substrate 10 are integrally formed in right and left side portions of the elevation member 31. Compression coil springs 32 as second biasing means are attached to the spring holding pins 31b, and lower ends of the pins are in contact with the surface of the substrate 10.

Accordingly, as shown in FIG. 5, in normal times, the elevation member 31 is moved upward by repulsive forces of the compression coil springs 32, and the operating member 25 is lifted by the force of elevation movement of the elevation member. Further, when the operation button 27 of the operating member 25 is pressed, the operating member 25 is pressed toward the substrate 10, thereby the elevation member 31 moves downward. Then the reverse board 15 of the press switch device 14 is pressed and reversed by a press projection 31c projected from the lower surface of the elevation member 31, and the output from the press switch device 14 is turned ON.

Note that the coil outer diameter of the compression coil springs 28, the thickness of the operating member 25 and the amount of vertical movement of the operating member 25 are set such that when the operation button 27 is press-operated and the operating member 25 moves toward the substrate 10, the compression coil springs 28 do not fall from the spring holding portions 26b of the guide slits 26.

In the two-direction input device 11 having the above structure, in a state where an operating force is not applied to the operation button 27, the operating member 25 is in the neutral position in the Y1-Y2 direction by the compression coil springs 28 as shown in FIG. 4. At this time, outputs from the pair of switch devices 12 and 13 constructing detection means are OFF. Further, as the elevation member 31 is lifted by the compression coil springs 32 shown in FIGS. 3 and 5 and the operating member 25 is also lifted by the forces of the springs, the press projection 31c on the lower surface of the elevation member 31 is away from the press switch device 14. Accordingly, the output from the press switch device 14 is also OFF.

As shown in FIG. 4, when the operating member 25 is in the neutral position, if the operation button 27 exposed in the upper surface of the case 21 is pressed, the operating member 25 and the elevation member 31 are moved downward along the first support projections 22 and the second support projections 23, and the reverse board 15 of the press switch device 14 is reversed by the press projection 31c of the elevation member 31, thereby the press switch device 14 is turned ON. At this time, if the pressing force applied to the operation button 27 is released, the elevation member 31 and the operating member 25 move upward, thus the initial state is restored.

Next, when the operation button 27 is slid in the Y1 direction from the neutral position in FIG. 4, the switch device 12 is turned ON by the first detection dent portion 29a. On the other hand, when the operation button 27 is slid in the Y2 direction, the switch device 13 is turned ON by the second detection dent portion 29b. Then, in a state where the operation button 27 is moved in the Y1 direction or moved in the Y2 direction and the operation button 27 is pressed, the operating member 25 and the elevation member 31 move downward, to turn the press switch device 14 ON.

As the two-direction input device 11 enables two-direction inputs as described above, various input operations different from conventional operations can be performed by installing the two-direction input device 11 with the flat input member 2 in the operating portion of the personal computer.

For example, the flat input member 2 is operated with a finger or the like, to move a cursor displayed on a display screen to a predetermined icon. Then, when the press switch device 14 is turned ON by pressing the operation button 27 in the neutral position as shown in FIG. 4, software corresponding to the icon starts. Further, if the flat input member 2 is operated to move the cursor to the position of menu display of the software and the operation button 27 in the neutral position is pressed to turn the press switch device 14 ON, a menu image can be opened.

If the switch device 12 is turned ON by moving the operation button 27 in the Y1 direction, one of displayed menu items is selected in the downward direction. Further, when the operation button 27 is returned to the neutral position and again moved in the Y1 direction, a lower menu item is selected. When the operation button 27 is moved in the Y2 direction, an upper menu item is selected. Then in a state where one of the menu items is selected by moving the operation button 27 in the Y1 or Y2 direction, when the operation button 27 is pressed, the selected menu item can be determined.

Further, the two-direction input device 11 can be utilized for input of vertical scroll operation on the display screen. For example, in a case where word processor software operates, when the operating member 25 is moved in the Y1 or Y2 direction while the press switch device 14 is not pressed, and the switch device 12 or 13 is turned ON, character strings displayed on the screen move upward/downward by line or several lines. Further, in a state where the operation button 27 is pressed while the press switch device 14 is ON, when the operation button 27 is moved in the Y1 or Y2 direction to turn the switch device 12 or 13 ON, the character strings on the screen are scrolled upward/downward. Then, when the pressing force applied to the operation button 27 is released, the scroll operation stops.

The above respective operations can be set by software and a driver installed in the computer, and settings of the operations can be changed.

Further, in FIG. 1, a menu determination operation or the like can be assigned to the input by the press type input devices 3 and 4 positioned on the right and left sides, as in the case of the conventional computers.

Further, if it is arranged such that two of the two-direction input devices 11 are provided and the operation button 27 moves in the forward/backward direction in one of the two-direction input devices 11 while the operation button 27 moves in the horizontal direction in the other one of the two-direction input devices 11, a cursor on a display screen or the like can be moved in horizontal and vertical directions.

Further, it may be arranged such that variable input means such as a variable resistor, in place of the pair of switch devices 12 and 13, is operated by the operating member 25 of the two-direction input device 11 for various operation inputs by continuous variable output. In this case, the operating member 25 can be press-operated in any position, and as a result, the press switch device can be operated.

As described above, in the two-direction input device of the present invention, the operating member can be press-operated in a position to which the operating member has been linearly moved. Accordingly, various input operations different from the conventional operations can be performed. Further, in a case where the two-direction input device of the present invention is used with a flat input device or the like in personal computers and the like, various operations can be assigned to the respective input devices, thus the various operations can be performed.

What is claimed is:

1. A two-direction input device comprising:
   an operating member movable in a linear movement direction within a predetermined range and movable in an orthogonal direction to the linear movement direction, said operating member being movable in the orthogonal direction irrespective of the position or linear movement of the operating member;
   a detection means for detecting the linear movement of the operating member when said operating member is moved from a neutral position; and
   a press switch device, said press switch device being operable when the operating member is moved in the orthogonal direction,
   wherein said detection means comprises a first switch and a second switch, the first switch being operable when the operating member is moved in a first linear direction from the neutral position, the second switch being operable when the operating member is moved from the neutral position in a second linear direction, the second linear direction being parallel to and opposite from the first linear direction, and
   wherein said first switch and said second switch each comprise a switch body and a pressure-sensitive lever arm rotatably mounted thereon, said first switch and said second switch each being operable when the pressure-sensitive lever arm is engaged by said operating member.

2. The two-direction input device according to claim 1, further comprising:
   a planar substrate on which the press switch device is provided;
   a case fixed to the substrate; and
   an elevation member which is reciprocally movable within the case in a direction substantially perpendicular to the substrate, and which operates the press switch device when said elevation member is moved towards the substrate,
   wherein the operating member is linearly-movably supported on the elevation U member and is disposed within the case.

3. The two-direction input device according to claim 2, further comprising:
   a first biasing means for biasing the operating member towards the neutral position in the linear movement direction; and
   a second biasing means for biasing the elevation member in a direction away from the substrate and the press switch device.

4. An operating device comprising a combination of a flat input member enabling coordinate input and the two-direction input device in claim 1.

5. The operating device according the claim 4, wherein, when a direction toward an operator is defined as a forward direction, the two-direction input device is positioned in between the flat input member and the operator, and the linear movement of the operating member of the two-direction input device is parallel with the forward direction.

6. The operating device according to claim 4, wherein at least on press-type input member is provided on the operating device adjacent to the two-direction input device.

7. The operating device according to claim 4, the linear movement of the operating member performs a scrolling operation and the orthogonal movement of the operating member performs a selecting operation.

* * * * *

UNITED STATES PATENT AND TRADEMARK OFFICE
CERTIFICATE OF CORRECTION

PATENT NO.     : 6,603,459 B2
DATED          : August 5, 2003
INVENTOR(S)    : Hideto Matsufusa et al.

It is certified that error appears in the above-identified patent and that said Letters Patent is hereby corrected as shown below:

<u>Title page,</u>
Item [74], under *"Primary Examiner"* delete "Harry" and substitute -- Henry -- in its place.

<u>Column 8,</u>
Line 41, after "elevation" delete "U".
Line 54, after "according" delete "the" and substitute -- to -- in its place.

Signed and Sealed this

Eleventh Day of November, 2003

JAMES E. ROGAN
*Director of the United States Patent and Trademark Office*